Oct. 26, 1971 G. J. LAUGHLIN 3,615,089

CARD TRANSPORT

Filed May 29, 1969 6 Sheets-Sheet 1

INVENTOR.
GERALD J. LAUGHLIN
BY
Andrew G. Dillon

INVENTOR.
GERALD J. LAUGHLIN
BY
Andrew M. Pillon

CARD TRANSPORT

Filed May 29, 1969 6 Sheets-Sheet 3

INVENTOR.
GERALD J. LAUGHLIN

BY

Andrew N. Vullo

INVENTOR.
GERALD J. LAUGHLIN
BY
[signature]

INVENTOR.
GERALD J. LAUGHLIN
BY
Andrew G. Pullos

INVENTOR.
GERALD J. LAUGHLIN
BY 3,615,089
CARD TRANSPORT
Gerald J. Laughlin, Palo Alto, Calif., assignor to Singer-General Precision, Inc., Binghamton, N.Y.
Filed May 29, 1969, Ser. No. 828,923
Int. Cl. B65h 9/06
U.S. Cl. 271—3 2 Claims

ABSTRACT OF THE DISCLOSURE

The disclosed embodiment of the present invention is a mechanism for transporting an aperture card from a card reader, which reads the punched address on the card, to an optical scanning station, which scans the optical information in the film area of the card. The card reader reads the information in the form of punched holes on the card beginning with the left end and progressing toward the right end of the card, with the result that the card is ejected from the card reader with the left end leading. The present invention reverses the direction of travel of the cards ejected from the card reader such that the location of the aperture can be properly referenced from the right end of the card in the optical scanner. The direction of travel is reversed by means of a pivoted track section which accepts cards at one angular position and ejects cards in the opposite direction at a second angular position. The ejected card is received by a second track section which conveys the card to the optical scanning station. Each card is properly positioned in the optical scanning station by means of a pair of card edge guides and a card end stop. One card edge guide is movable to permit a pair of card extractors and a pair of rollers to remove the card edgewise from the scanning station.

This invention relates generally to a card transport and more particularly to a mechanism for conveying aperture cards from a card reader, which reads the punched information on the card, to an optical scanning station, which scans the optical information in the film area of the card to provide a video signal output.

An aperture card contains address information in the form of punched holes having predeterrmined locations and optical information in the form of a 35 mm. film frame. The address information is entered from the left end of the card, while the location of the aperture containing the microfilm is referenced to the right end of the card. Accordingly, the aperture card must be advanced with its left end leading in the card reader, which reads the address information starting with column one on the left end of the card, and must be advanced with its right end leading to register it against an end stop in the optical scanning station. A transport which is capable of receiving a card from a card reader, reversing the direction of travel of the card, and accurately positioning the card with respect to an optical scanning station is not presently commercially available. Accordingly, it is an object of the present invention to provide a card transport which is capable of reversing the direction of travel of a card passing therethrough.

Although attempts have been made in the past to construct card transports which are capable of reversing the direction of travel of a card, such transports have not been successful for various reasons. One of these reasons is that very complicated mechanisms have been devised for reversing the direction of travel of the card passing through the card transport. Another reason for the lack of success of such prior known devices is that the reversing mechanisms were prone to causing damage to the aperture cards on occasion. Such damage, regardless of the extent or frequency, cannot be tolerated. Accordingly, it is another object of the present invention to provide an aperture card transport which reverses the direction of travel of a card passing therethrough by the use of relatively simple and inexpensive mechanisms.

Another object of the present invention is to provide a card transport which is capable of reversing the direction of travel of a card passing therethrough without causing any damage to the card.

Another problem associated with aperture card transports is that of accurately positioning a card with respect to a reading or scanning station. This problem is aggravated by the fact that once the card is scanned, it must be moved from the scanning station, which condition dictates the requirement for movable indexing structures. A further object of the present invention, therefore, is to provide a card transport which accurately positions an aperture card in a read or scanning station and is further capable of ejecting such a card from the scanning station without jeopardizing the capability of maintaining a high degree of accuracy.

Still another problem associated with card transports, particularly those which are capable of reversing the direction of travel of a card therethrough, is that such transports are excessively large, requiring a considerable amount of space. Accordingly, it is still another object of the present invention to provide a card transport which is capable of reversing the direction of travel of a card passing therethrough and which requires a minimum amount of space.

A feature of the present invention resides in the provision of a pivoted track section which is movable between two positions. The pivoted track is disposed for receiving the card at one position thereof and further disposed for advancing the card toward an optical scanning station in the other position thereof. The pivoted track section provides an additional feature which permits a card which has been positioned therein by appropriate rollers to be disengaged from the rollers so as to reduce the possibility of damage to the cards.

Another feature of the present invention resides in the provision of means for initiating the travel of the card in an opposite direction after the card is received onto the pivoted track section, which means does not engage the card until it is ready to be advanced to the optical scanning station, thereby further reducing the possibility of damage to the card.

Another feature of the present invention resides in the provision of a rigid indexing or referencing surface for an aperture card positioned in the optical scanning station and independent means for ejecting the card therefrom.

Still another feature of the present invention resides in the provision of means for releasing the card after it is positioned in the optical scanning station, thereby further reducing the possibility of damage to the card and increasing the positioning accuracy.

Yet another feature of the present invention resides in the provision of relatively simple and effective means for operating each of the operational elements of the card transport in synchronism.

These and other objects, features and advantages of the present invention will be more fully realized and understood from the following detailed description when taken in conjunction with the accompanying drawings, wherein.

Like reference numerals throughout the various views of the drawings are intended to designate the same or similar structures.

Figure 1:
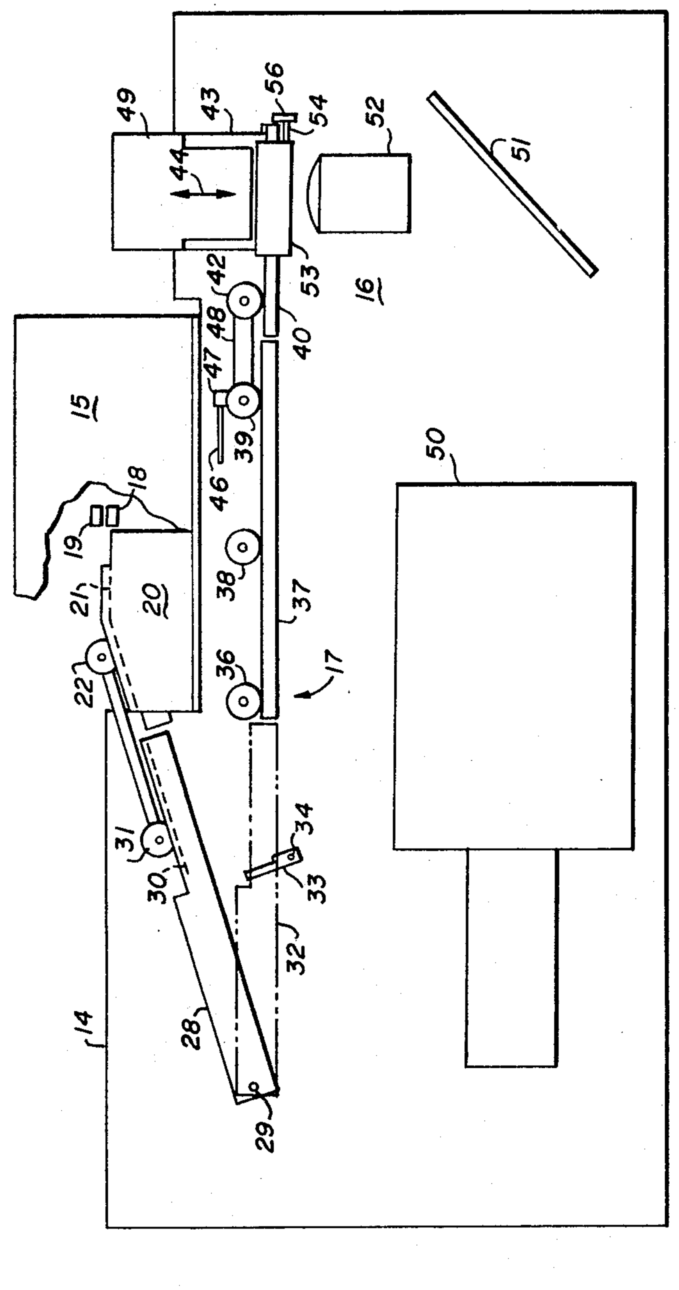
FIG. 1 is a diagrammatic side view of a card transport constructed in accordance with the principles of the present invention.

With reference to FIG. 1, there is shown in diagrammatic form a mounting plate 14, a card reader 15, an optical scanning station 16 and a card transport constructed in accordance with the principles of the present invention and generally designated with the reference numeral 17. The card reader 15 reads the information which is in the form of punched holes on the aperture card by means of an illumination source 18 and photoelectric elements 19. The card reader 15 moves an aperture card between the source 18 and the elements 19 onto a track section 20 which guides a card along a path shown by the dotted line which is designated with the reference numeral 21 and into engagement with a roller 22. Since the card reader 15 forms no part of the present invention, its details need not be further described for an understanding of the present invention.

Figure 2:
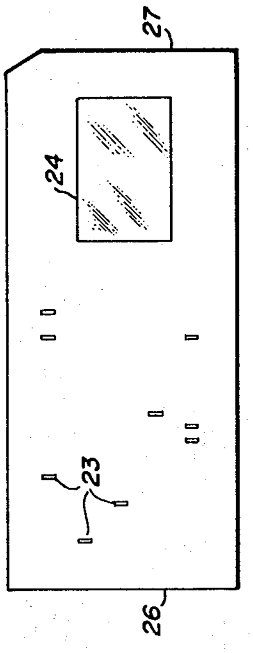
FIG. 2 is a plan view of a typical aperture card.

A typical aperture card is illustrated in FIG. 2 as containing a plurality of punched holes 23 and supporting a frame of film 24 in an aperture therein. The punched holes 23 are read in succession by the film reader 15 from a left end 26 of the aperture card, whereas the film strip 24 is positioned with respect to a right end 27 of the aperture card. Accordingly, aperture cards in the card reader 15 are positioned such that the end 26 is leading when the cards pass between the source 18 and the elements 19. However, when an aperture card is conveyed to the optical scanning station 16, it must be indexed therein with respect to the end 27. Therefore, the direction of travel of the aperture card must be reversed between the card reader 15 and the optical scanning station 16.

An aperture card in the track section 20 is conveyed by the roller 22 onto a track section 28 which is pivoted on a shaft 29. The path of an aperture card in the edge guides of the track section 28 is represented by a dotted line designated with the reference numeral 30. A roller 31 which has no back up roller or surface associated therewith receives the end 26 of an aperture card and conveys it fully onto the track section 28. In effect, since there is no back up roller or support for the roller 31, it gently nudges the card onto the section 28, thereby reducing the possibility of damage to the card.

As soon as the aperture card is fully received on the track section 28, a cam mechanism, which will be explained in greater detail hereinbelow, lowers the track section 28 to the phantom line outline thereof designated with the reference numeral 32. At the lower most position of the track section 28, a pair of fingers 33, which are pivoted on a shaft 34, engage the end 26 of the aperture card and push it into engagement with a roller 36 of a track section 37. The card is conveyed along the track section 37 by subsequent rollers 38 and 39 to the optical scanning station 16.

The optical scanning station 16 includes a track section 40 which receives the card from the track section 37 and forces the end 27 of the card against a stop 41 by means of a roller 42. A platen 43 which is movable in the directions indicated by the double headed arrow 44 clamps the film portion of the aperture card against a glass plate in the track section 40 (see FIG. 13) to permit scanning of the film frame. During the scanning operation and extraction of the aperture card from the optical scanning station 16, a linkage 46 rotates an arm 47 in a clockwise direction as shown in FIG. 1. The arm 47 is secured to a bracket 48 which is mounted on the shafts supporting the rollers 39 and 42 and disengages it from the aperture card which is positioned within the optical scanning station 16.

A lens assembly and photomultiplier tube 49 are mounted on the platen 43 and are disposed for receiving light passing through the film 24 and the aperture card. The film frame 24 is illuminated by a flying spot scanner 50 which directs a beam of light on the film by means of a mirror 51 and a lens assembly 52.

Figure 3:
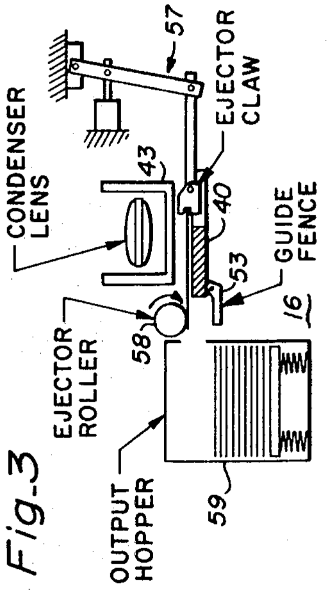
FIG. 3 is a diagrammatic end view of the mechanism employed for ejecting a card from an optical scanning station.

An edge guide 53 is pivotally mounted on a shaft 54 and rotatable by means of an arm 56. As shown in FIG. 3, the edge guide 53 can be lowered to permit an ejector mechanism 57 to engage an edge of the aperture card and move the card into edgewise engagement with an ejector roller 58. An output hopper 59 is mounted to receive aperture cards ejected from the scanning station 16.

Figure 4:
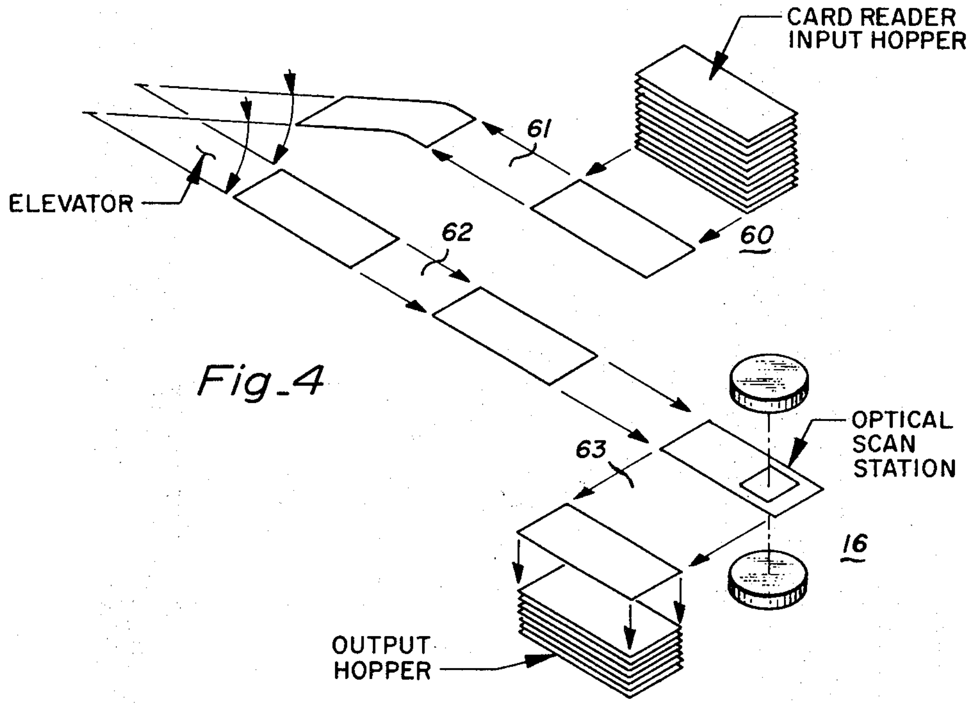
FIG. 4 is a view in perspective showing the path of travel of a card through the transport illustrated in FIGS. 1 and 2.

The path of an aperture card through the card transport illustrated in FIGS. 1 and 3 is shown more clearly in FIG. 4. The cards are withdrawn from an input hopper of the card reader 15 at a station designated with the reference numeral 60. After the cards are read by the card reader 15, they are moved along a path designated with the reference numeral 61 onto the track section 28 (see FIG. 1). When the track section 28 is rotated to its lower most position, the aperture card thereon is aligned with a path of travel designated with the reference numeral 62. The card is transported to the optical scanning station 16 where optical information is derived from the film frame thereon. Subsequently, the aperture card is transported along a path designated with the reference numeral 63 to the output hopper 59.

Figure 5:
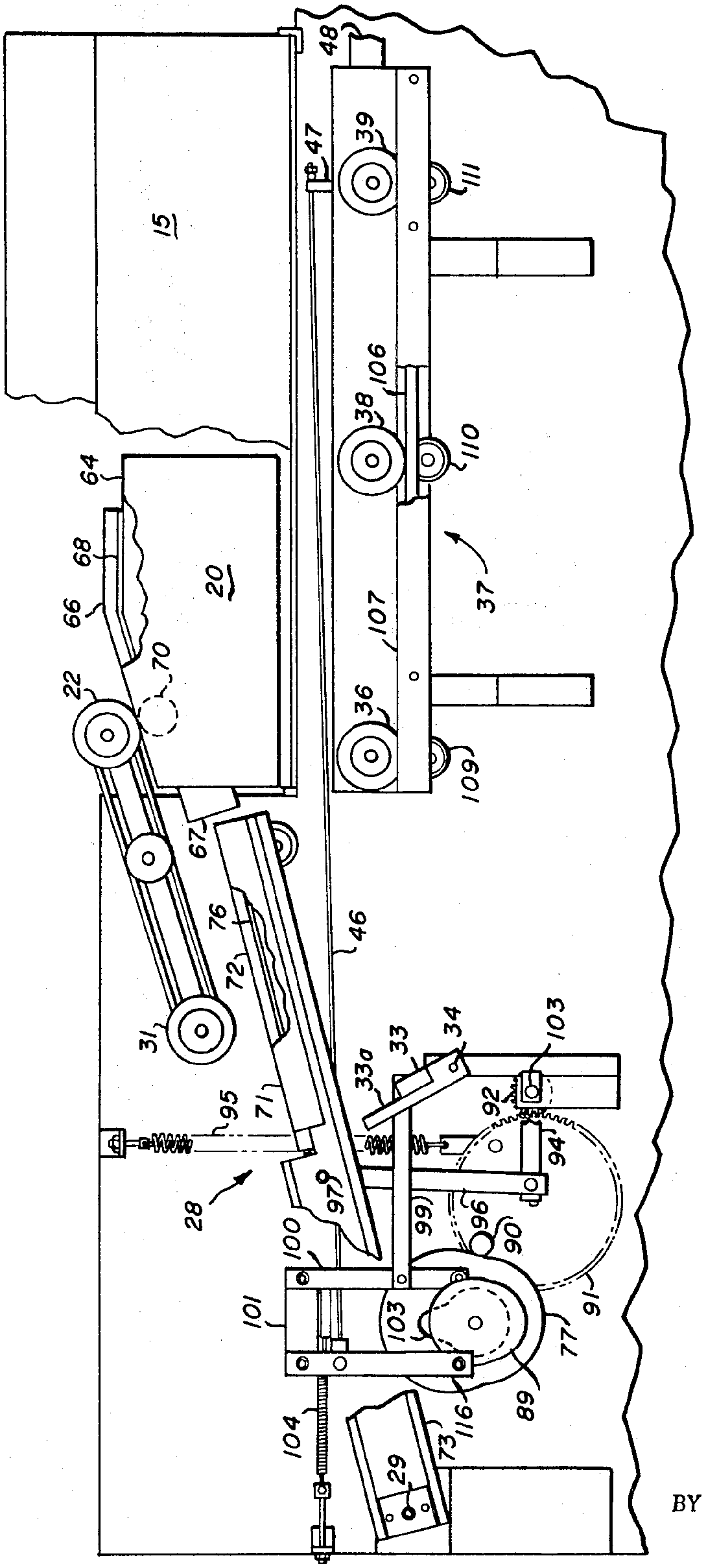
FIG. 5 is a detailed side elevational view of a portion of the transport illustrated in FIG. 1.
Figure 6:
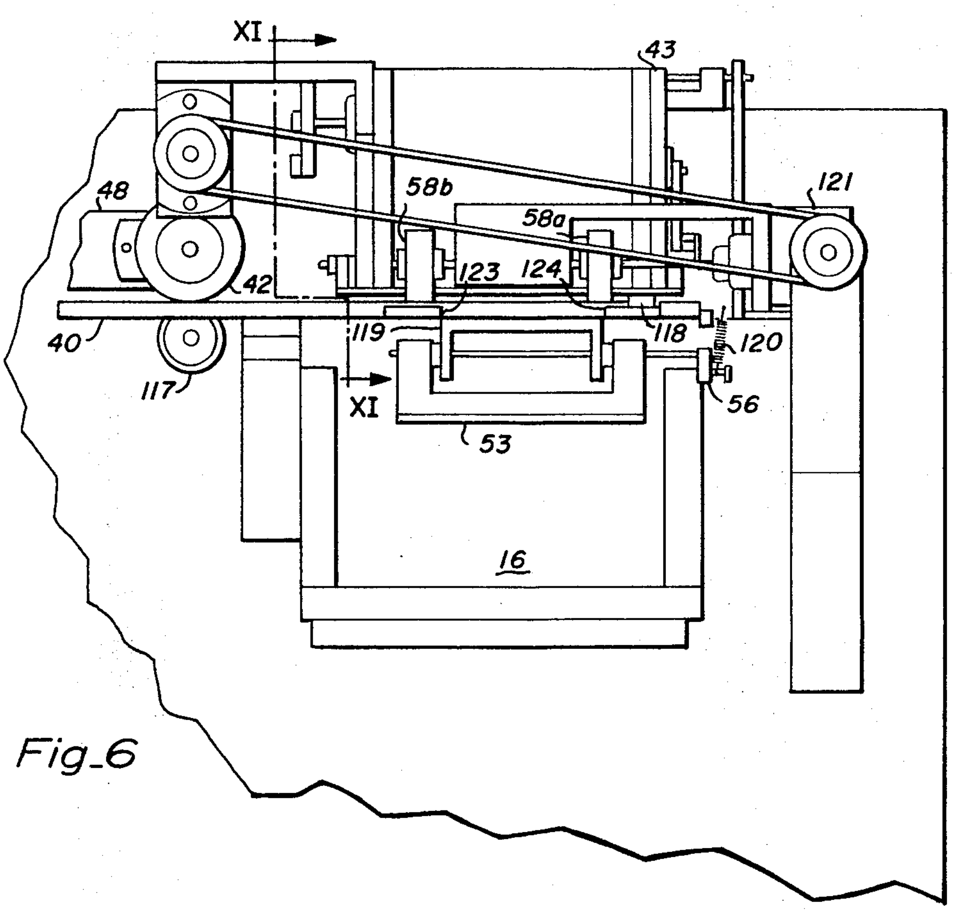
FIG. 6 is a detailed side elevational view of another portion of the transport illustrated in FIG. 1.
Figure 7:
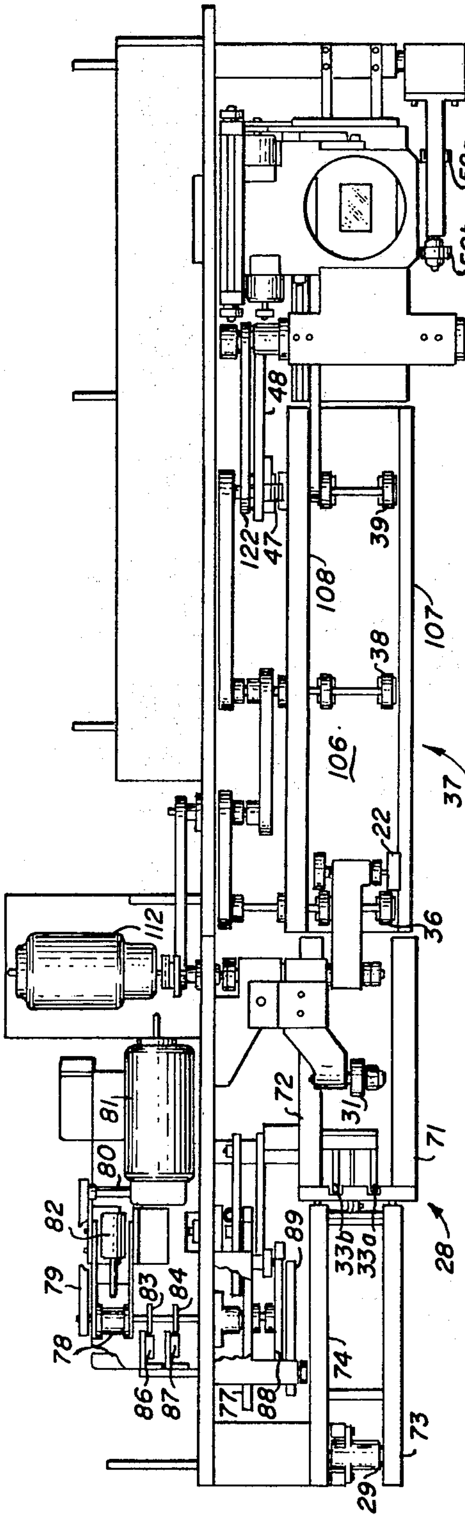
FIG. 7 is a plan view with some elements missing and others broken away of the transport illustrated in FIG. 1.
Figure 8:
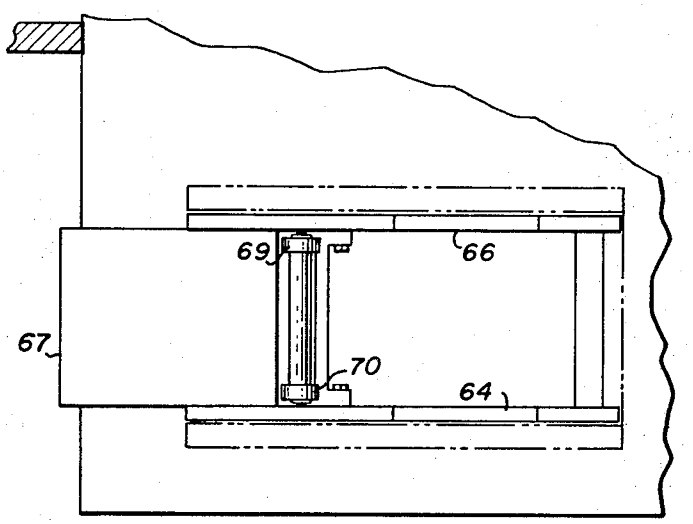
FIG. 8 is a plan view of the track section which initially receives an aperture card from the card reader.

For a better understanding of the details of the present invention, reference is made to FIGS. 5–13 of the drawings which illustrate a card transport constructed in accordance with the principles of the present invention. As shown in FIGS. 5 and 8, the track section 20 is formed of a pair of plates 64 and 66 and a support member 67 mounted therebetween. As shown in FIG. 5, the plate 66 is provided with a groove 68 which is disposed for receiving the edge of an aperture card therein to guide the card along the path 21. The plate 64 contains a similar groove for engaging the opposite edge of the aperture card. A pair of backup rollers 69 and 70 are mounted between the plate 64 and 66 and cooperate with the rollers 22 to engage an aperture card and transport it onto the track section 28.

As shown in FIGS. 5 and 7, the track section 28 is formed of a pair of rails 71 and 72 which are supported on arms 73 and 74, respectively. The rail 72 is shown as containing a groove 76 therein which is disposed for receiving an edge of an aperture card. The rail 71 is provided with a similar groove for receiving an opposite edge of an aperture card.

The track section 28 is raised and lowered by means of a cam 77 which is driven from a single turn clutch 78 (see FIG. 7). The single turn clutch 78 is connected by means of a belt 79 to an output shaft 80 of a motor 81. The motor 81 operates continuously to drive the input shaft of the single turn clutch 78, the output of which is restrained by the solenoid 82. Upon the application of a pulse to the solenoid 82, the single turn clutch 78 is released to rotate one revolution only. The output shaft of the single turn clutch drives a pair of cams 83 and 84 which are disposed for actuating micro switches 86 and 87 respectively. In addition, the output shaft of the clutch 78 drives the cam 77 and a pair of cams 88 and 89.

As previously mentioned, the track section 28 is raised and lowered by rotation of the cam 77. In particular, a cam follower 90 (see FIGS. 5 and 9) is journalled in an outer periphery of a gear 91 and engages the outer peripheral surface of the cam 77. The gear 91 engages a gear 92 which is mounted on a shaft 93. An arm 94 is also secured to the shaft 93 and rotates with the gear 92. A linkage 96 is pivotally supported between one end of the arm 94 and a pivot point 97 on the track section 28. Accordingly, when the cam 77 is rotated through one revolution, the track section 28 is first lowered from its upper most position to its lower most position and then raised again to its upper most position. The cam 77 is shaped to provide a dwell in the movement of the track section 28 at both its upper most position and at its lower most position.

Figure 9:
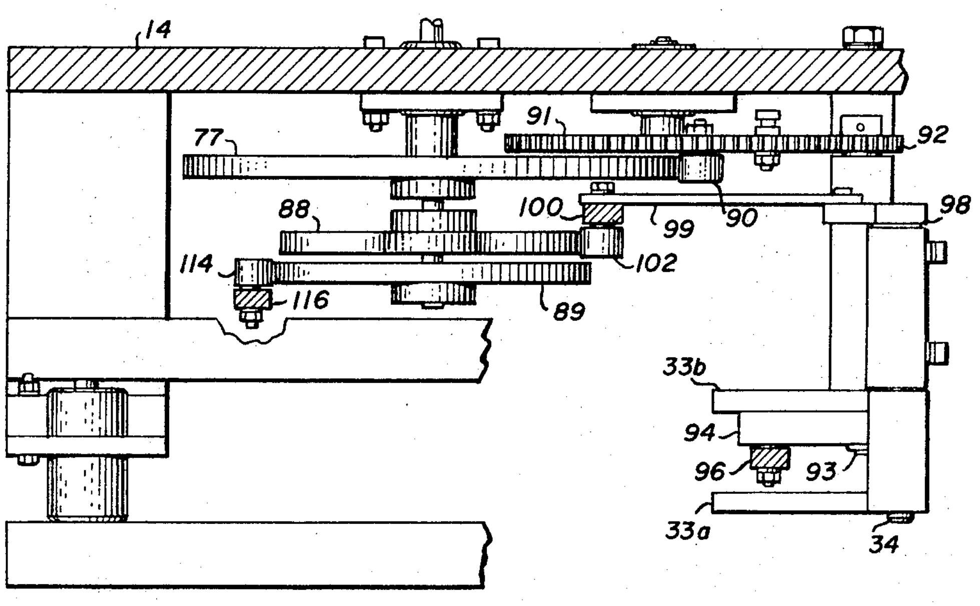
FIG. 9 is a plan view partially in section and partially broken away illustrating the cam mechanism employed for timing the operations of the transport illustrated in FIG. 1.

As shown in FIGS. 5, 7 and 9, a pair of fingers 33*a* and 33*b* are rotatably supported on the shaft 34 between the rails 71 and 72 of the track section 28. One end of the arm 98 is secured to an end of the shaft 34 and the other end thereof pivotally supports one end of a linkage 99. The other end of the linkage 99 is pivotally supported on a lever arm 100. One end of the lever arm 100 is pivotally supported on a bracket 101 and the other end thereof supports a cam follower 102 which engages the outer peripheral surface of the cam 88. As shown in FIG. 5, the cam 88 is provided with an eccentric 103 which causes the fingers 33*a* and 33*b* to first rotate in a clockwise direction to push a card from the track section 28 onto the track section 37 and then to rotate in a counter clockwise direction to return to the position illustrated in FIG. 5.

Figure 10:
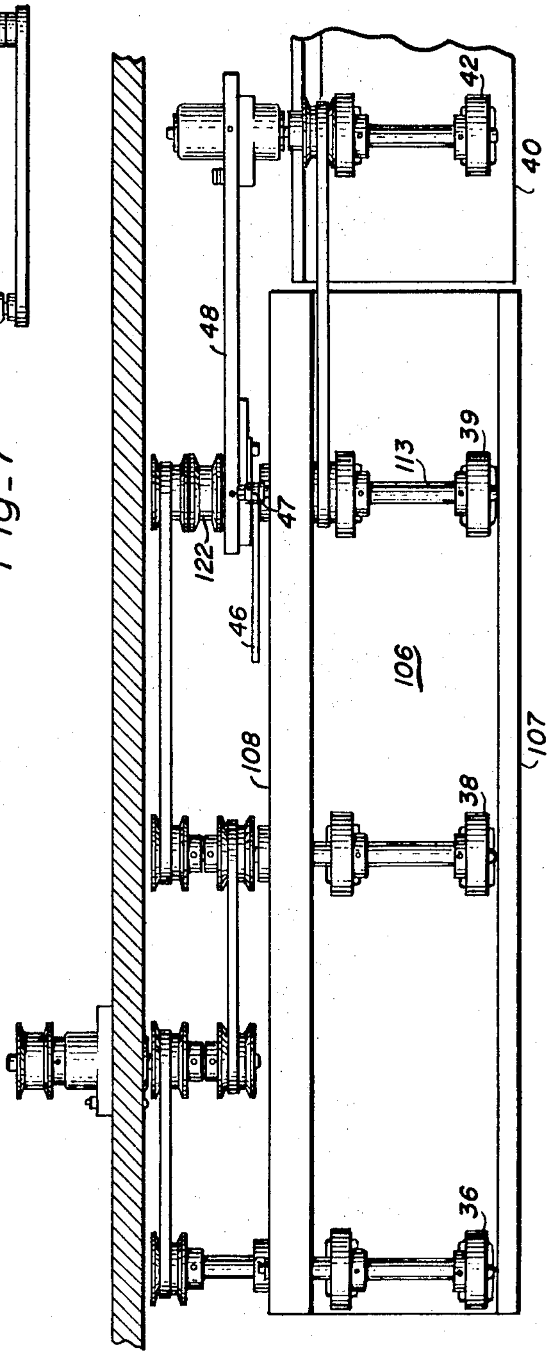
FIG. 10 is a plan view partially in section and partially broken away of a portion of the transport section which conveys an aperture card to the optical scanning station.

As shown in FIGS. 5, 7 and 10 of the drawings, the track section 37 includes a center platform 106 and a pair of side rails 107 and 108. The side rails 107 and 108 are not grooved, but constrain a card passing therethrough by edgewise engagement. The card is further retained by the rollers 36, 38 and 39. Pairs of backup rollers 109, 110 and 111 are provided for the rollers 36, 38 and 39, respectively.

As shown more clearly in FIG. 7, a motor 112 is connected by means of appropriate pulleys and belts to each of the rollers 36, 38 and 39. The roller 39 is mounted on a shaft 113 having the arm 47 and the bracket 48 secured thereto. As shown in FIG. 5, the cam 89 is engaged by a follower 114 (see FIG. 9) which is secured to one end of a lever arm 116. The linkage or rod 46 is secured at one end thereof to the arm 47 at the other end thereof to the lever arm 116. The bracket 101 pivotally supports one end of the arm 116 to permit the cam 89 through the mechanical linkage of the arm 116 and the rod 46 to rotate the arm 47 in a counter clockwise direction, thereby rotating the bracket 48 in a counter clockwise direction to lift the roller 42 away from the track section 40, thereby releasing its frictional force on the aperture card positioned in the optical scanning station.

The optical scanning station 116 is shown more clearly in FIGS. 6 and 7. A pair of backup rollers 117 cooperate with the rollers 42 to convey a card into the optical scanning station with the end 27 abutting against a stop 118. The edge guide 53 is shown in FIG. 6 in an extended rotational position to more clearly show the mounting therefor. The guide 53 is mounted on the shaft 54 which is, in turn, rotatably supported by a bracket 119. The shaft 54 is connected to the arm 56 which is biased to retain the guide 53 against an edge of the track section 40 by means of a spring 20.

Figure 11:
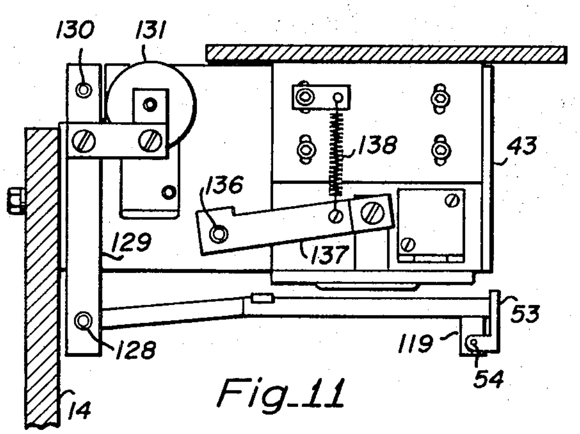
FIG. 11 is a sectional view generally taken along lines XI—XI of FIG. 7.
Figure 13:
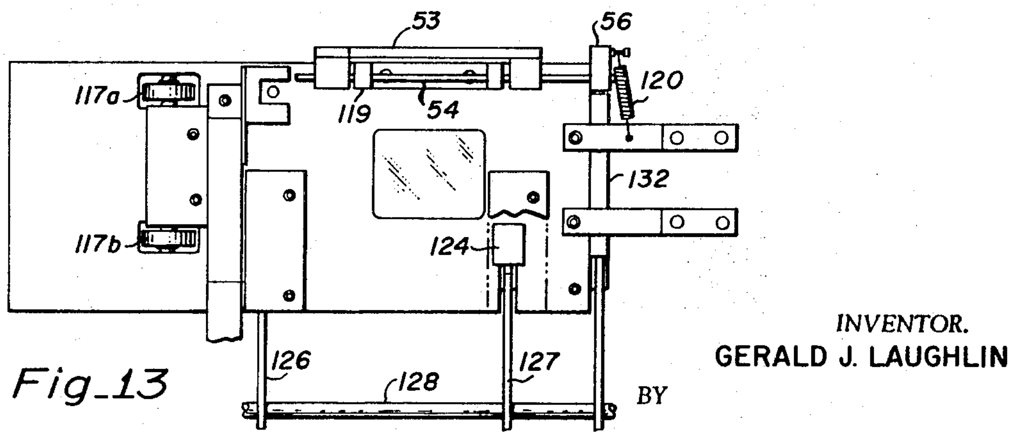
FIG. 13 is a bottom view of the optical scanning station.

Rollers 58*a* and 58*b* as shown in FIGS. 6 and 7 are provided for transporting a card into the output hopper 59. The rollers 58 are driven through a gear box 121 from a pulley 122 mounted on the shaft which supports the rollers 39. An aperture card in the optical scanning station is brought into engagement with the rollers 58*a* and 58*b* by means of the ejector mechanism 57 which includes a pair of ejector claws 123 and 124. As shown in FIGS. 11 and 13, the ejector claws 123 and 124 are connected by means of linkages 126 and 127, respectively, to a shaft 128. Lever arm 129 pivotally supports the shaft 128 in one end thereof and is pivotally mounted on a shaft 130 at the other end thereof. A solenoid 131 is connected to the lever arm 129 and is effective upon actuation thereof to cause the ejector claws 123 and 124 to push a card in the optical scanning station 16 into engagement with the rollers 58 and 59. Simultaneously, the arm 56 is rotated by means of a push rod 132 which is also secured to the shaft 128.

Figure 12:
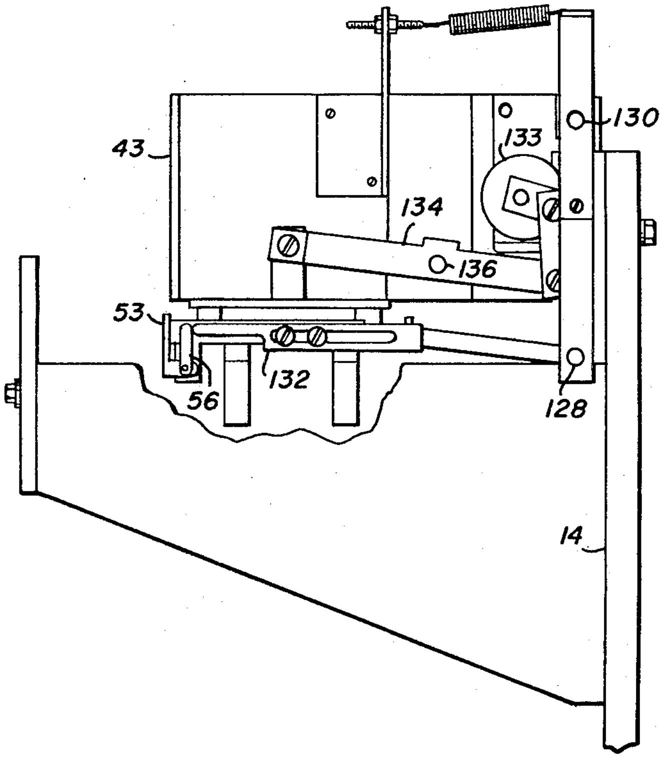
FIG. 12 is an end view of the optical scanning station as viewed from the right end of FIG. 7.

As shown in FIG. 12, the platen 43 is raised and lowered by a solenoid 133 and a linkage assembly including a lever arm 134 which is pivotally on a shaft 136. As shown in FIG. 11, a lever arm 137 is pivotally mounted on the shaft 136 and is secured to the platen 43. A spring 138 biases the lever arm 137 in an upward direction to maintain the platen 43 raised until actuation of the solenoid 133 clamps the platen 43 onto an aperture card. The solenoids 131 and 133 are actuated by microswitches 86 and 87 (see FIG. 7).

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

The invention claimed is:

1. A mechanism for transporting a card from one station to another station, comprising (a) a track having two positions, (b) means for moving said track to one of said positions to receive a card thereon from the one station and to the other of said positions to eject the card therefrom, (c) means for engaging the card in the other position of said track and for ejecting the card therefrom, (d) means for accepting the card ejected from said track in the second position thereof and moving the card to the other station, (e) a stationary end stop for the card in the other station, (f) a movable edge guide for the card in the other station, and (g) means for actuating said ejecting means and concurrently displacing said edge guide.

2. A mechanism for transporting a card from one station to another station, comprising (a) a track having two positions, (b) means for moving said track to one of said positions to receive a card thereon from the one station and to the other of said positions to eject the card therefrom, (c) means for engaging the card in the other position of said track and for ejecting the card therefrom, (d) means for accepting the card ejected from said track in the second position thereof and moving the card to the other station, and (e) a stationary end stop for the card in the other station, said accepting means including means for releasing the card when an end thereof has engaged said end stop.

References Cited

UNITED STATES PATENTS

| | | | |
|---|---|---|---|
| 501,319 | 7/1893 | Bowman | 271—3 X |
| 770,486 | 9/1904 | White | 271—CF Dig |
| 2,443,281 | 6/1948 | Terry | 271—3 |
| 3,180,933 | 4/1965 | Shaler et al. | 271—CF Dig |

JOSEPH WEGBREIT, Primary Examiner

U.S. Cl. X.R.

197—27; 271—57